United States Patent
Nonomura

(10) Patent No.: US 11,347,377 B2
(45) Date of Patent: May 31, 2022

(54) CHARACTER INPUT DEVICE, CHARACTER INPUT METHOD, AND CHARACTER INPUT PROGRAM

(71) Applicant: OMRON Corporation, Kyoto (JP)

(72) Inventor: Yui Nonomura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 27 days.

(21) Appl. No.: 16/795,648

(22) Filed: Feb. 20, 2020

(65) Prior Publication Data
US 2020/0293159 A1    Sep. 17, 2020

(30) Foreign Application Priority Data
Mar. 14, 2019  (JP) .............................. JP2019-046946

(51) Int. Cl.
  *G06F 3/0482*    (2013.01)
  *G06F 40/242*    (2020.01)
  *G06F 3/04886*   (2022.01)
  *G06F 3/023*     (2006.01)

(52) U.S. Cl.
  CPC .......... *G06F 3/0482* (2013.01); *G06F 3/0233* (2013.01); *G06F 3/04886* (2013.01); *G06F 40/242* (2020.01)

(58) Field of Classification Search
  CPC .... G06F 3/04886; G06F 21/316; G06F 21/32; G06F 21/83; G06F 2221/2151
  See application file for complete search history.

(56) References Cited

U.S. PATENT DOCUMENTS

| | | | | |
|---|---|---|---|---|
| 6,088,481 A | * | 7/2000 | Okamoto | G06F 3/0488 345/179 |
| 2009/0193334 A1 | * | 7/2009 | Assadollahi | G06F 3/0237 715/261 |
| 2010/0323762 A1 | * | 12/2010 | Sindhu | G06F 1/1613 455/566 |
| 2013/0046544 A1 | * | 2/2013 | Kay | G06F 16/3322 704/275 |
| 2014/0278349 A1 | * | 9/2014 | Grieves | G06F 40/242 704/8 |

(Continued)

FOREIGN PATENT DOCUMENTS

| EP | 2128749 A2 | * | 12/2009 | ........... G06F 3/0485 |
|---|---|---|---|---|
| EP | 2128749 A2 | | 12/2009 | |

(Continued)

OTHER PUBLICATIONS

An extended European search report (EESR) dated Jul. 24, 2020 in a counterpart European patent application.

(Continued)

*Primary Examiner* — Rayeez R Chowdhury
(74) *Attorney, Agent, or Firm* — Metrolex IP Law Group, PLLC

(57) ABSTRACT

A character input device includes an input operation unit that receives an input of a character string, an operation detector that detects a change from a state in which the character string is output, a character string entry detector that enters the character string based on the change and generates an entered suggestion, and a storage that stores the entered suggestion as a conversion suggestion.

11 Claims, 8 Drawing Sheets

(56) References Cited

U.S. PATENT DOCUMENTS

| | | | | |
|---|---|---|---|---|
| 2014/0316784 A1* | 10/2014 | Bradford | ........... | G10L 15/18 |
| | | | | 704/245 |
| 2014/0333535 A1* | 11/2014 | Stafford | ........... | G06F 3/038 |
| | | | | 345/158 |
| 2015/0029090 A1* | 1/2015 | Kim | ........... | G06F 3/017 |
| | | | | 345/156 |
| 2016/0282956 A1* | 9/2016 | Ouyang | ........... | G06F 3/04883 |
| 2016/0299685 A1* | 10/2016 | Zhai | ........... | G06F 3/0219 |
| 2017/0255598 A1* | 9/2017 | Sendai | ........... | G10L 15/1815 |
| 2017/0308247 A1* | 10/2017 | Luipold | ........... | G06F 16/90328 |

FOREIGN PATENT DOCUMENTS

| | | |
|---|---|---|
| JP | H11212967 A | 8/1999 |
| JP | 2008250708 A | 10/2008 |
| JP | 2009-288888 A | 12/2009 |
| JP | 2012037446 A | 2/2012 |
| JP | 2013145431 A | 7/2013 |

OTHER PUBLICATIONS

Japanese Office Action dated Mar. 29, 2022 in a counterpart Japanese patent application.

* cited by examiner

CHARACTER INPUT DEVICE, CHARACTER INPUT METHOD, AND CHARACTER INPUT PROGRAM

CROSS-REFERENCE TO RELATED APPLICATION

This application claims priority to Japanese Patent Application No. 2019-046946 filed on Mar. 14, 2019, the contents of which are incorporated herein by reference.

FIELD

The disclosure relates to a character input technique for learning conversion suggestions for an input character.

BACKGROUND

A structure described in Patent Literature 1 learns a combination of a first phrase and a second phrase when the characters of the first phrase are input, followed by no operation including cursor movement or deletion, and then the second phrase is input. The combination of the first phrase and the second phrase is registered with a suggestion dictionary database when this combination appears frequently in inputting characters.

CITATION LIST

Patent Literature

Patent Literature 1: Japanese Unexamined Patent Application Publication No. 2009-288888

SUMMARY

Technical Problem

However, the structure described in Patent Literature 1 cannot learn a character input accompanied by cursor movement or character deletion, and may decrease usability.

One or more aspects are directed to efficient learning of conversion suggestions for input characters.

Solution to Problem

A character input device includes an input operation unit that receives an input of a character string, an operation detector that detects a change from a state in which the character string is output, a character string entry detector that enters the character string based on the change and generates an entered suggestion, and a storage that stores the entered suggestion as a conversion suggestion.

This structure detects a state change during character input and learns an input character as a conversion suggestion based on the state change, and improves usability for the user.

A controller may delete the entered suggestion from the storage when the character string entry detector included in the character input device detects deletion of the entered suggestion after the change.

This structure does not learn a character string as a conversion suggestion when a delete key is pressed to delete the character string. This structure thus does not learn an erroneous conversion suggestion, and thus further improves usability for the user.

The controller included in the character input device may analyze a tendency for generating the entered suggestion, and associate the tendency and the entered suggestion with each other.

This structure provides a conversion suggestion in accordance with the tendency of the user.

The character input device may further include a suggestion display that displays one or more of the conversion suggestions. The controller may determine an order of the conversion suggestions to appear on the suggestion display based on the tendency.

This structure displays the conversion suggestions in an order determined in accordance with the tendency of the user, and improves usability.

Advantageous Effects

One or more aspects allow efficient learning of conversion suggestions for input characters.

DETAILED DESCRIPTION

Embodiments will now be described with reference to the drawings.

EXAMPLE USE

Figure 1:
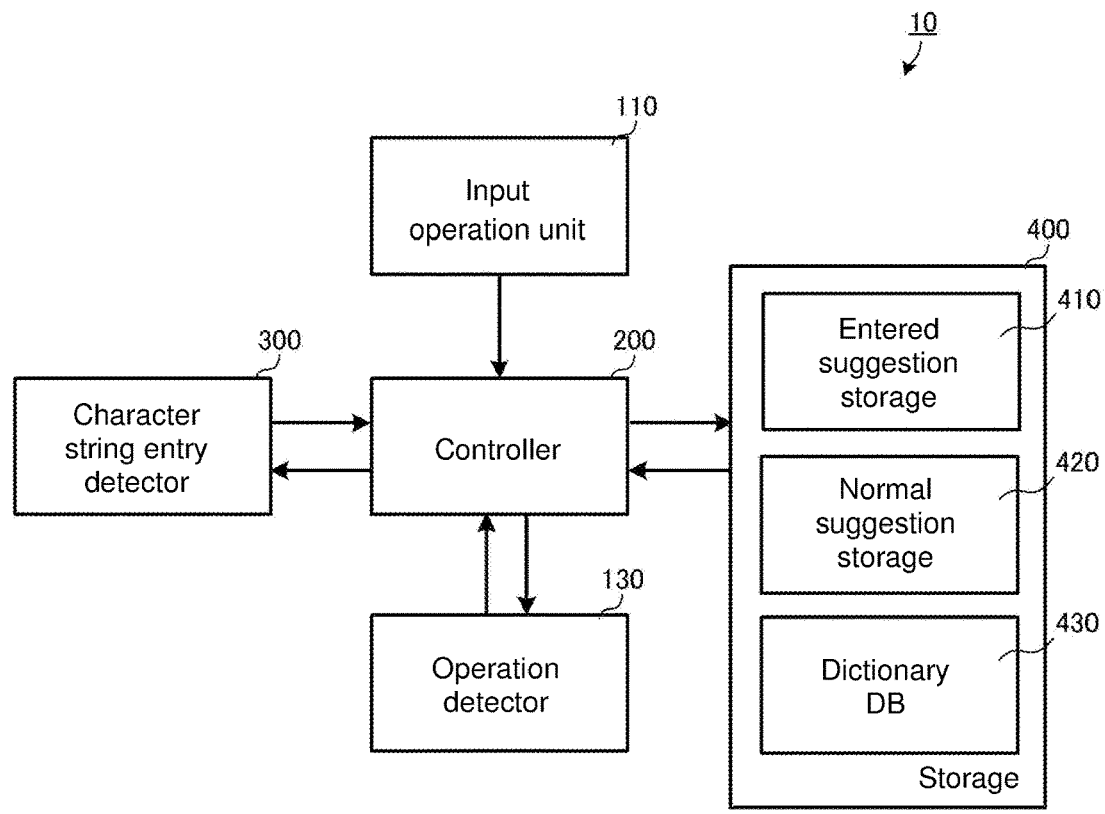
FIG. 1 is a block diagram illustrating a character input device according to a first embodiment.

An example use will be described first with reference to FIG. 1. FIG. 1 is a block diagram of a character input device 10 according to a first embodiment. The character input device 10 is included in, for example, a mobile communication terminal such as a smartphone including a character input keyboard that is used to input characters.

The character input device 10 includes an input operation unit 110, an operation detector 130, a controller 200, a character string entry detector 300, and a storage 400. The storage 400 includes an entered suggestion storage 410, a normal suggestion storage 420, and a dictionary database (DB) 430. The dictionary DB 430 stores conversion suggestions including typical character strings.

The input operation unit 110 is, for example, a software keyboard on a touchscreen display in a smartphone (smart device) that displays keys and receives character inputs. The input operation unit 110 further includes an enter button for entering a character string, a delete button for deleting a character string, and a suggestion display for displaying conversion suggestions for a character string.

The entered suggestion storage 410 and the normal suggestion storage 420 will be described first. For example, the normal suggestion storage 420 stores a character string (hereafter, a normal suggestion) entered by explicitly pressing, for example, the enter button (hereafter, normal entry) after conversion from a character string input by the user. Normal entry may be performed by selecting a suggestion appearing as a conversion suggestion, rather than pressing the enter button.

While a character string input by the user is being suspended (hereafter, in a suspend state), the entered suggestion storage 410 stores a character string (hereafter, an entered suggestion) entered by a change in the suspend state (hereafter, a state change). A state change may be movement of an input focus from where a character string is currently being input.

A state change is not limited to movement of the input focus. A state change may also include an operation other than normal entry, or more specifically, for example, pressing a button on the smartphone to return to a previous processing step, an interrupt of a conversion operation by an incoming call to the smartphone, and an interrupt of a conversion operation by reception of an email.

The input focus represents the location at which an input or operation is enabled in a system using multiple windows. In the examples described below, the input focus indicates a character input field that can receive an input, and the input focus can move from the character input field (this is referred to as movement of the input focus).

For example, the user activates an email application and touches the character input field. A character input field provided by the email application then receives a user input of a character string. The controller 200 then activates a character input keyboard included in the input operation unit 110. Although an email application is used as an application having a character input field, an example application is not limited to an email application.

The user inputs a character string on the character input keyboard. The input operation unit 110 outputs a character string conversion operation to the controller 200. The controller 200 searches the dictionary DB 430 for conversion suggestions for the character string. The controller 200 outputs the conversion suggestions on the suggestion display included in the input operation unit 110.

The user selects an intended conversion suggestion to be a conversion-suspended state from the conversion suggestions output to the suggestion display by pressing a convert button any number of times. The input operation unit 110 outputs the selected conversion suggestion to the controller 200. The controller 200 causes the conversion suggestion to appear in the character input field. The conversion suggestion has yet to be entered.

A process performed by the user for entering a character string by moving the input focus in the input operation unit 110 will be described. To enter an intended conversion suggestion, the user moves the input focus from the character input field. The operation detector 130 detects the movement of the input focus, and outputs information indicating the movement to the controller 200.

The controller 200 outputs information indicating the movement of the input focus to the character string entry detector 300. In response to the movement of the input focus, the character string entry detector 300 generates an entered suggestion based on the conversion suggestion. The character string entry detector 300 outputs the entered suggestion to the controller 200. The controller 200 stores the entered suggestion into the entered suggestion storage 410.

A process performed by the user pressing the enter button included in the input operation unit 110 will be described. The same processing is performed as described above from when the user selects an intended conversion suggestion from conversion suggestions output to the suggestion display to when a character string appears in the character input field.

To enter the conversion suggestion, the user presses the enter button in the input operation unit 110. The input operation unit 110 then outputs, to the controller 200, information indicating that the enter button has been pressed.

The controller 200 outputs, to the character string entry detector 300, information indicating that the enter button has been pressed. In response to the enter button being pressed, the character string entry detector 300 generates a normal suggestion based on the conversion suggestion. The character string entry detector 300 outputs the normal suggestion to the controller 200. The controller 200 stores the normal suggestion into the normal suggestion storage 420.

This structure can learn conversion suggestions when the input focus is moved, in addition to when the user explicitly presses the enter button, and improves usability for the user.

Example Structure 1

Figure 2:
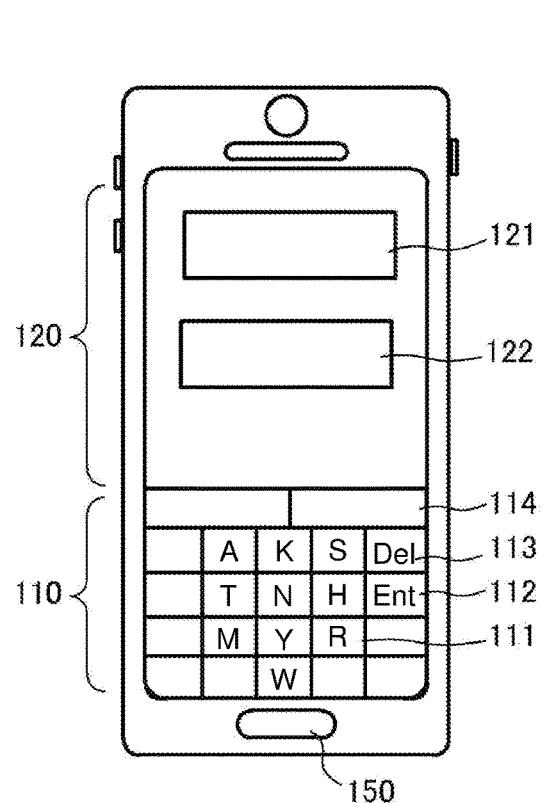
FIG. 2 is a schematic diagram illustrating a character input device according to a first embodiment.
Figure 3:
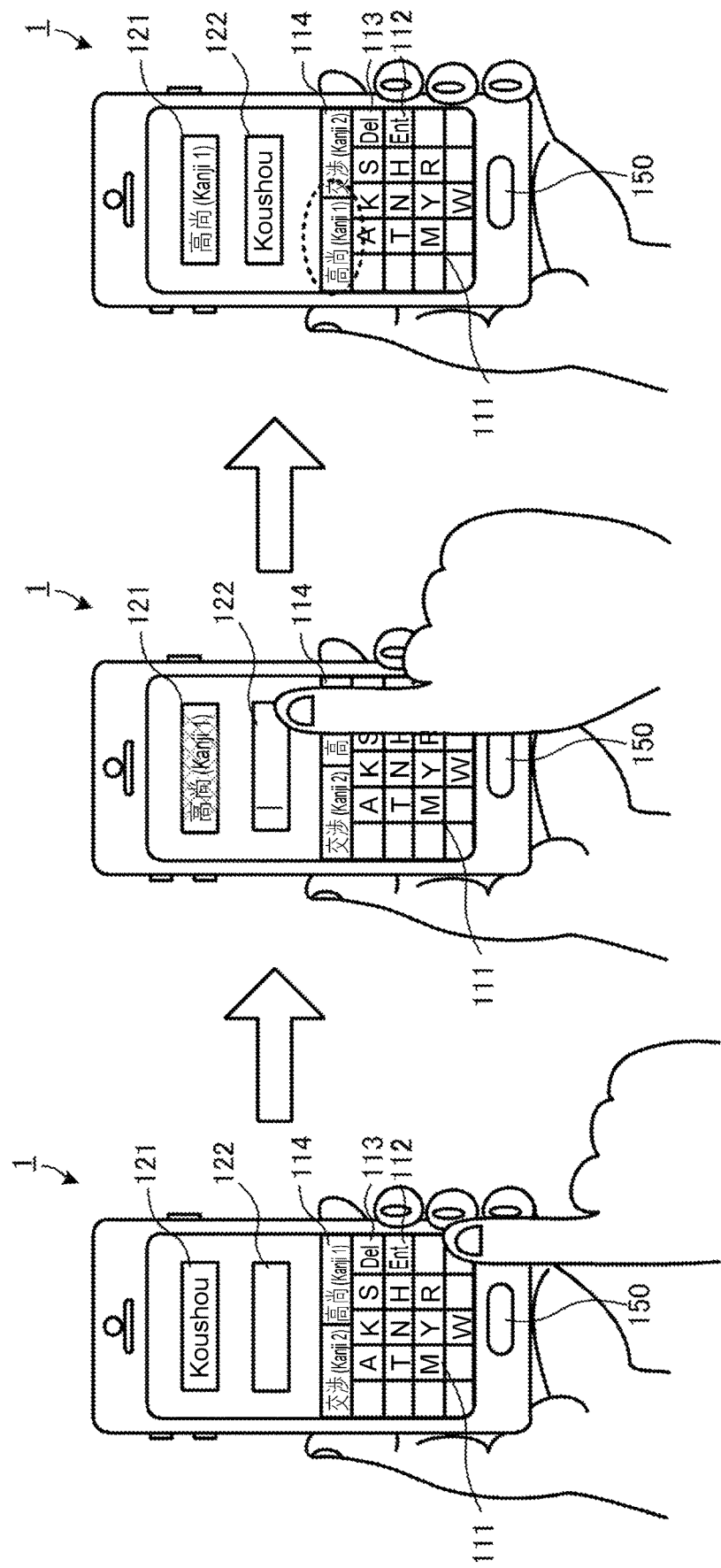
FIGS. 3A to 3C are schematic diagrams illustrating a character input device according to a first embodiment.
Figure 4:
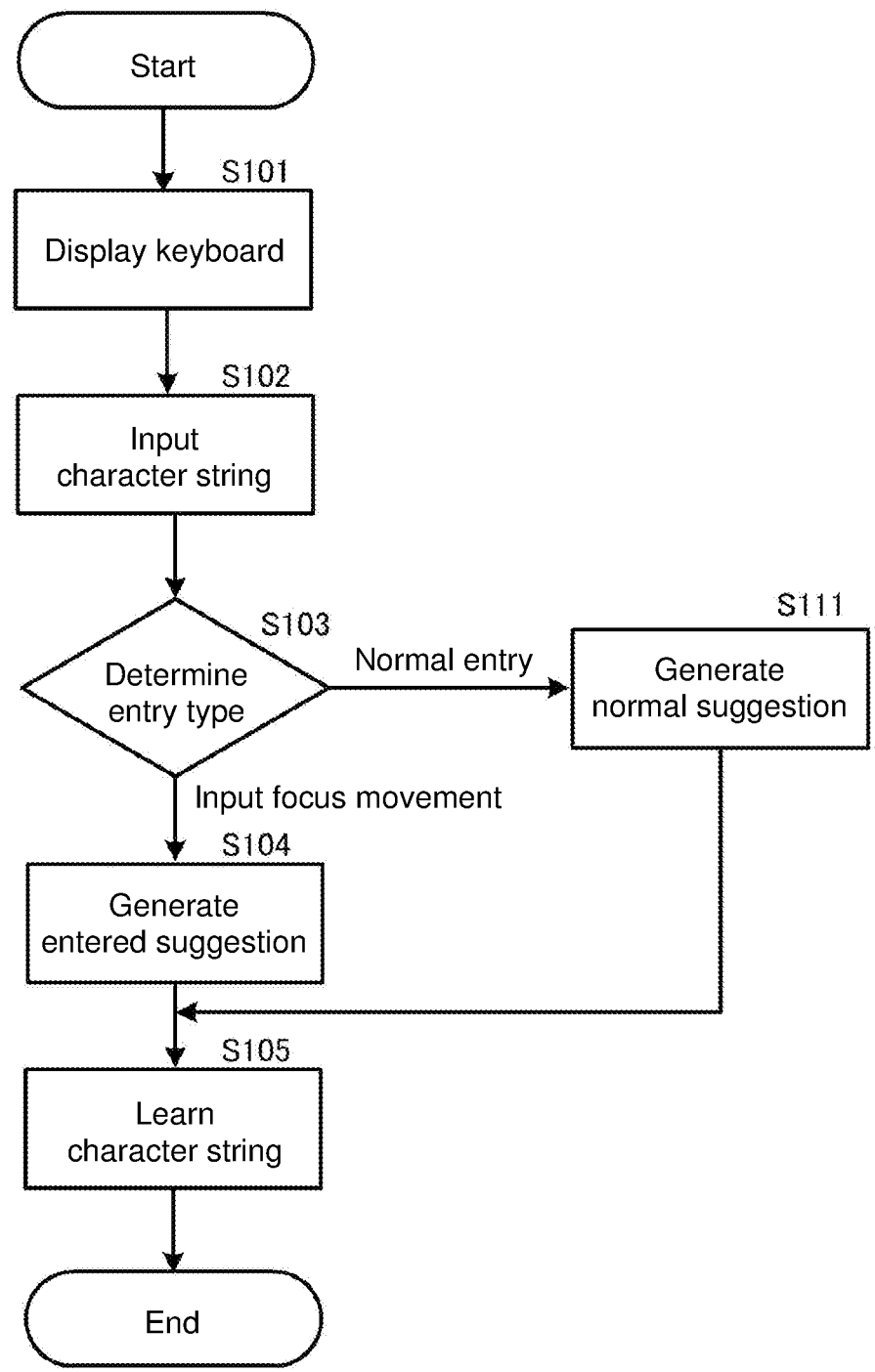
FIG. 4 is a flow diagram showing an operation illustrating a character input device according to a first embodiment.

FIG. 1 is a block diagram of a character input device 10 according to a first embodiment. FIG. 2 is a schematic diagram of the character input device 10 according to a first embodiment. FIGS. 3A to 3C are schematic diagrams of the character input device 10 according to a first embodiment. FIG. 4 is a flowchart showing an operation of the character input device 10 according to a first embodiment.

An example structure will be described in more detail with reference to FIGS. 2 and 3A to 3C based on the structure of the character input device 10 shown in FIG. 1.

As shown in FIG. 2, a smartphone 1 includes the character input device 10 and a home button 150. The home button 150 is used to display, for example, a standby screen of a smartphone. When the home button 150 is pressed with some applications running, all the applications running are suspended, and the standby screen appears. A smartphone without the home button 150 may simply have a function equivalent to displaying of the standby screen. Although a smartphone is used herein, the same applies to another smart device with functions similar to the functions of a smartphone, such as a tablet.

The input operation unit 110 includes a character input keyboard 111, an enter button 112, a delete button 113, and a suggestion display 114.

A more specific process will be described with reference to FIGS. 3A to 3C.

The user activates an email application. The email application includes character input fields 121 and 122.

As shown in FIG. 3A, the user selects (touches) the character input field 121 provided by the email application. The operation detector 130 outputs, to the controller 200, information indicating that the character input field 121 has the input focus.

The controller 200 activates the input operation unit 110. The user uses the character input keyboard 111 to input the Japanese hiragana characters Koushou. The input operation unit 110 outputs the character string Koushou to the controller 200. The controller 200 searches the dictionary DB 430 for conversion suggestions relevant to the character string Koushou. The controller 200 outputs the corresponding different sets of kanji (Chinese) characters (hereafter, Kanji 1 and Kanji 2) for the character string Koushou to the suggestion display 114.

As shown in FIG. 3B, the user selects the character string Kanji 1 in the suggestion display 114 as a conversion-suspended suggestion. The input operation unit 110 outputs, to the controller 200, information indicating the selection of the characters Kanji 1. The controller 200 outputs the character string Kanji 1 to the character input field 121. Selecting a character string herein refers to changing the character string into a conversion-suspended state, but is not entering the character string.

The user then moves the input focus from the character input field 121 to the character input field 122. The operation detector 130 thus detects movement of the input focus. The operation detector 130 outputs, to the controller 200, information indicating the movement of the input focus. The controller 200 outputs, to the character string entry detector 300, information indicating entry of the character string Kanji 1 in response to the movement of the input focus.

The character string entry detector 300 generates an entered suggestion (character string Kanji 1) based on the conversion suggestion. The character string entry detector 300 outputs the entered suggestion Kanji 1 to the controller 200. The controller 200 stores the entered suggestion Kanji 1 into the entered suggestion storage 410.

As shown in FIG. 3C, the user inputs the hiragana characters Koushou in the character input field 122. The input operation unit 110 outputs the hiragana character string Koushou to the controller 200. The controller 200 first searches the entered suggestion storage 410 for character strings relevant to the hiragana character string Koushou. The controller 200 then searches the normal suggestion storage 420 and the dictionary DB 430. The suggestion display 114 displays the different sets of characters Kanji 1 and Kanji 2 in the stated order.

Referring back to FIG. 3B, when the character string Kanji 1 is entered in the character input field 121 by pressing the enter button 112 in the input operation unit 110, the input operation unit 110 outputs, to the controller 200, information indicating that the enter button 112 has been pressed.

The controller 200 outputs, to the character string entry detector 300, information indicating that the enter button 112 has been pressed. The character string entry detector 300 generates a normal suggestion based on the conversion suggestion. The character string entry detector 300 outputs the normal suggestion to the controller 200. The controller 200 stores the normal suggestion into the normal suggestion storage 420.

A process performed by the character input device 10 will be described with reference to the flowchart in FIG. 4.

In response to the selection of the character input field 121 provided by the email application, the character input device 10 displays the character input keyboard 111 (S101).

The character input field 121 receives an input of a character string. The controller 200 then outputs conversion suggestions for the character string to the suggestion display 114 (S102).

The type of entry for the character string is determined (S103). When the operation detector 130 detects movement of the input focus from the character input field 121 (input focus movement in S103), the character string entry detector 300 generates an entered suggestion (S104).

The controller 200 stores the entered suggestion into the entered suggestion storage 410, and learns the character string (S105).

When the operation detector 130 detects the enter button 112 being pressed (normal entry in S103), the character string entry detector 300 generates a normal suggestion (S111).

The controller 200 stores the normal suggestion into the normal suggestion storage 420, and learns the character string (S105).

This structure can learn conversion suggestions when the input focus is moved, in addition to when, for example, the user explicitly presses the enter button, and thus improves the usability for character input.

The structure described above displays the entered suggestion with priority. However, the structure may analyze the tendency of the user to enter character strings either by moving the input focus or by pressing the enter button, and may statistically obtain the information.

Also, the structure may associate each character string with the tendency, and may determine the order of the suggestions to appear, or specifically, whether to output, to the suggestion display 114, the entered suggestion or the normal suggestion with priority.

The entered suggestion storage 410 and the normal suggestion storage 420 may be integral with each other. In this case, a flag may be used to indicate either the entered suggestion or the normal suggestion.

Example Structure 2

A specific structure of a character input device 10 will now be described with reference to FIGS. 5A to 5D. FIGS. 5A to 5D are schematic diagrams of a character input device 10 according to a modification of a first embodiment. FIG. 6 is a flowchart showing an operation of the character input device 10 according to the modification of a first embodiment.

The modification of a first embodiment differs from a first embodiment in that the home button 150 is pressed. The other components and processes are the same as those in a first embodiment, and will not be described.

Figure 5A:
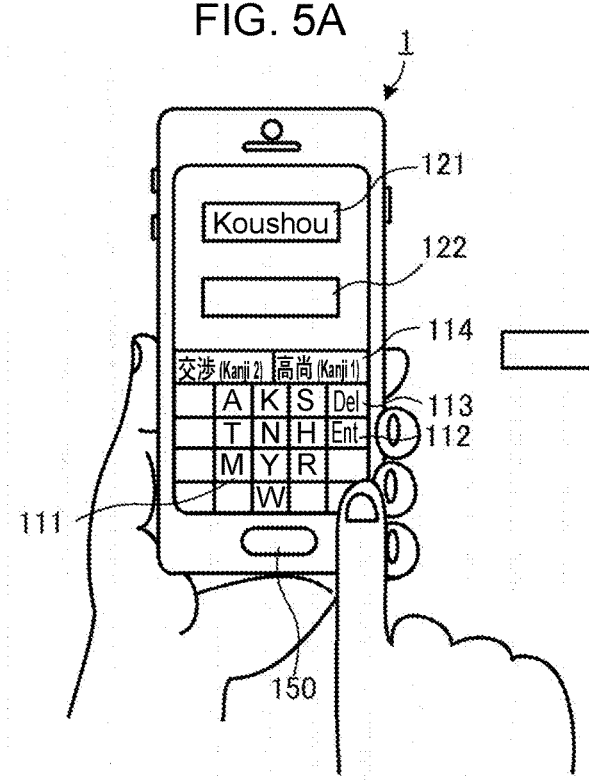
FIGS. 5A to 5D are schematic diagrams illustrating a character input device according to a modification of a first embodiment.
Figure 6:
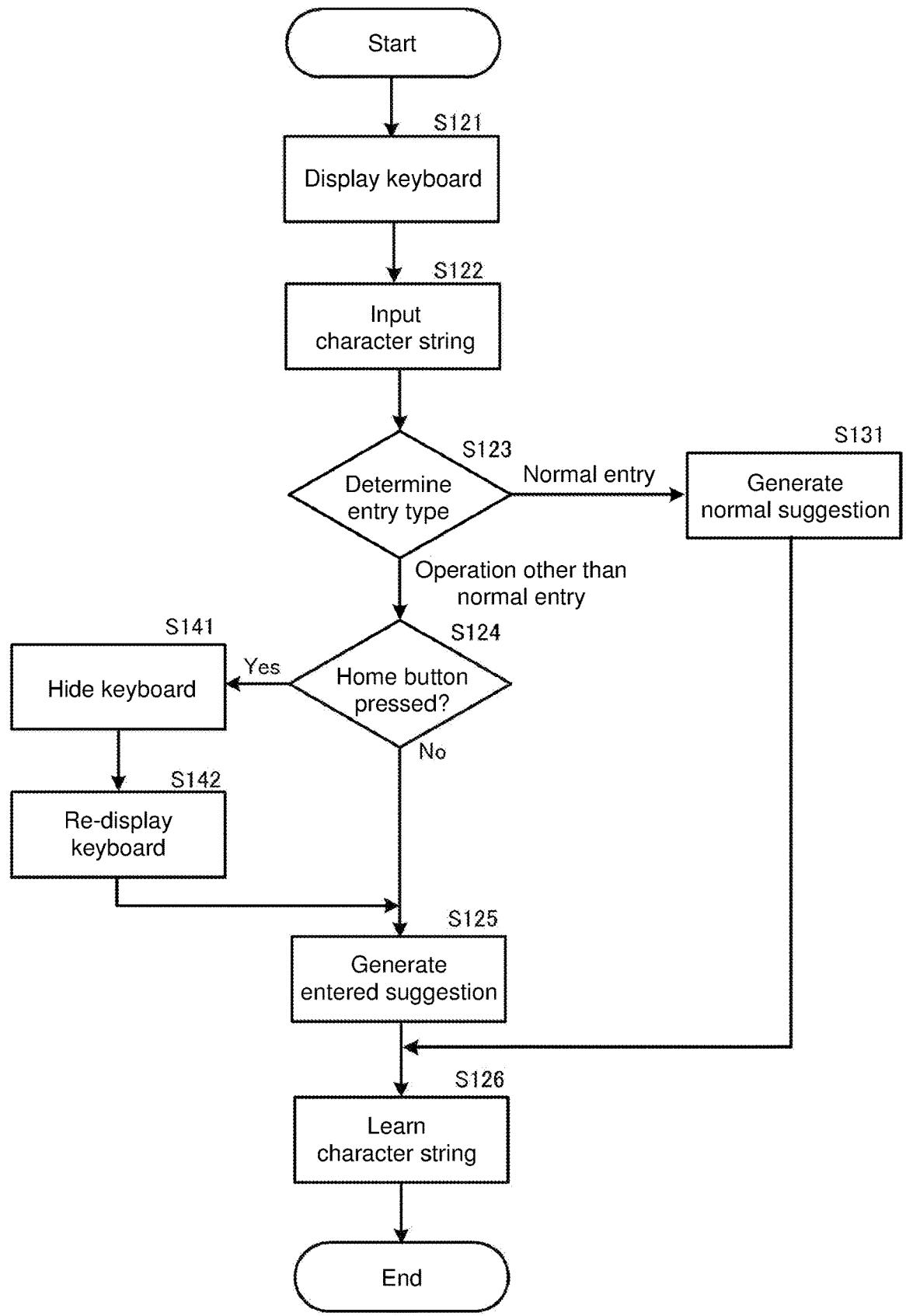
FIG. 6 is a flow diagram showing an operation illustrating a character input device according to a modification of a first embodiment.

As shown in FIG. 5A, in response to the hiragana characters Koushou input by the user in the character input field 121 provided by the email application, the corresponding different sets of kanji characters (hereafter, Kanji 1 and Kanji 2) for the character string Koushou are output to the suggestion display 114.

Figure 5B:
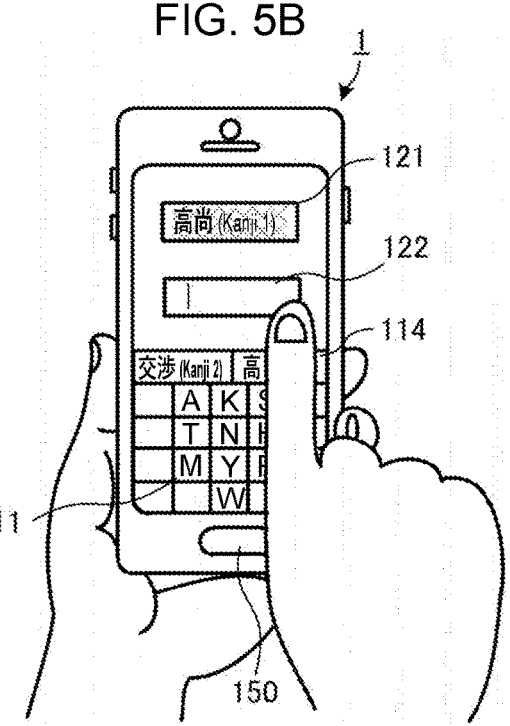

As shown in FIG. 5B, the user selects the character string Kanji 1 in the suggestion display 114 as a conversion-suspended suggestion. The input operation unit 110 outputs, to the controller 200, information indicating the selection of the character string Kanji 1.

The user then moves the input focus from the character input field 121 to the character input field 122. The operation detector 130 thus outputs, to the controller 200, information indicating that the character string Kanji 1 has been entered.

The controller 200 outputs, to the character string entry detector 300, information indicating that the selected character string Kanji 1 has been entered.

The character string entry detector 300 outputs the character string Kanji 1 to the controller 200 as an entered suggestion. The controller 200 stores the character string Kanji 1 into the entered suggestion storage 410.

Figure 5C:
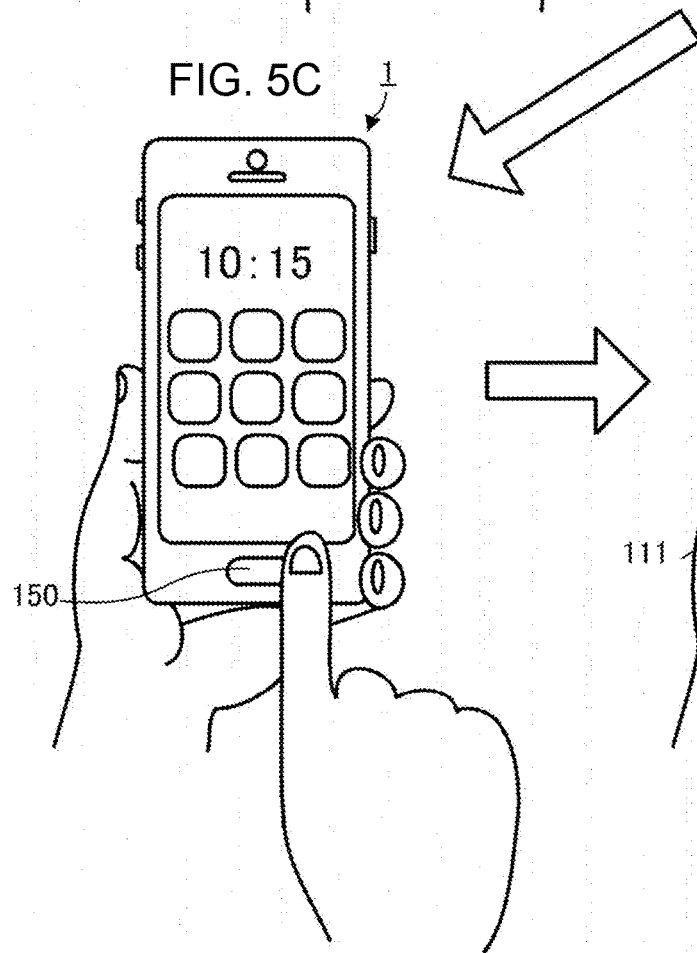

As shown in FIG. 5C, the user presses the home button 150 to display the standby screen of the character input device 10. This interrupts the operation on the character input fields 121 and 122.

Figure 5D:
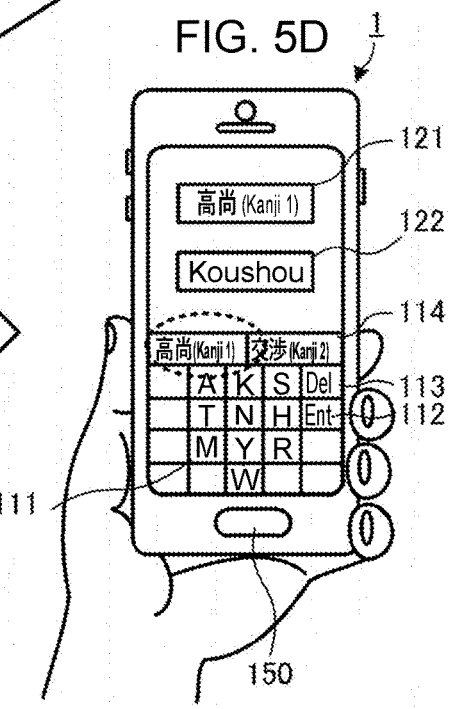

As shown in FIG. 5D, the user reactivates the character input fields 121 and 122. The user inputs the hiragana characters Koushou in the character input field 122. The input operation unit 110 outputs the character string Koushou to the operation detector 130. The operation detector 130 outputs the character string Koushou to the controller 200. The controller 200 first searches the entered suggestion storage 410 for character strings relevant to the hiragana character string Koushou. The controller 200 then searches the normal suggestion storage 420 and the dictionary DB 430. The suggestion display 114 displays the different sets of characters Kanji 1 and Kanji 2 in the stated order.

A process performed by the character input device 10 will be described with reference to the flowchart in FIG. 6.

In response to the selection of the character input field 121, the character input device 10 displays the character input keyboard 111 (S121).

The character input field 121 receives an input of a character string. The controller 200 thus outputs conversion suggestions for the character string to the suggestion display 114 (S122).

The operation detector 130 determines the type of entry for the character string (S123). When the operation detector 130 detects an operation other than normal entry in the character input field 121 (operation other than normal entry in S123), the character input device 10 determines whether the home button 150 is pressed (S124).

When the home button 150 is pressed (Yes in S124), the character input device 10 hides the character input keyboard 111 (S141). The character input keyboard 111 receives an operation for re-display (S142). The character string entry detector 300 generates an entered suggestion, and stores the entered suggestion into the entered suggestion storage 410 (S125).

When the home button 150 is not pressed (No in S124), the character string entry detector 300 generates an entered suggestion, and stores the entered suggestion into the entered suggestion storage 410 (S125).

The controller 200 learns the character string (S126).

When the operation detector 130 detects, for example, the enter button 112 being pressed (normal entry in S123), the character string entry detector 300 generates a normal suggestion, and stores the normal suggestion into the normal suggestion storage 420 (S131). The controller 200 learns the character string (S126).

The structure described above performs the processing in steps S141 and S142 after the home button 150 is pressed in step S124, followed by the processing for generating the entered suggestion in step S125. However, after the home button 150 is pressed in step S124, the processing for generating the entered suggestion in step S125 may be performed, and then the processing in steps S141 and S142 may be performed.

This structure can also learn character strings when any processing is interrupted by pressing the home button 150, in addition to when the user explicitly presses the enter button 112, and improves the usability for character input further.

Although the home button 150 is pressed in the above structure, the same structure is also applicable to when any processing is interrupted by an incoming call or by reception of an email.

Example Structure 3

Figure 7:
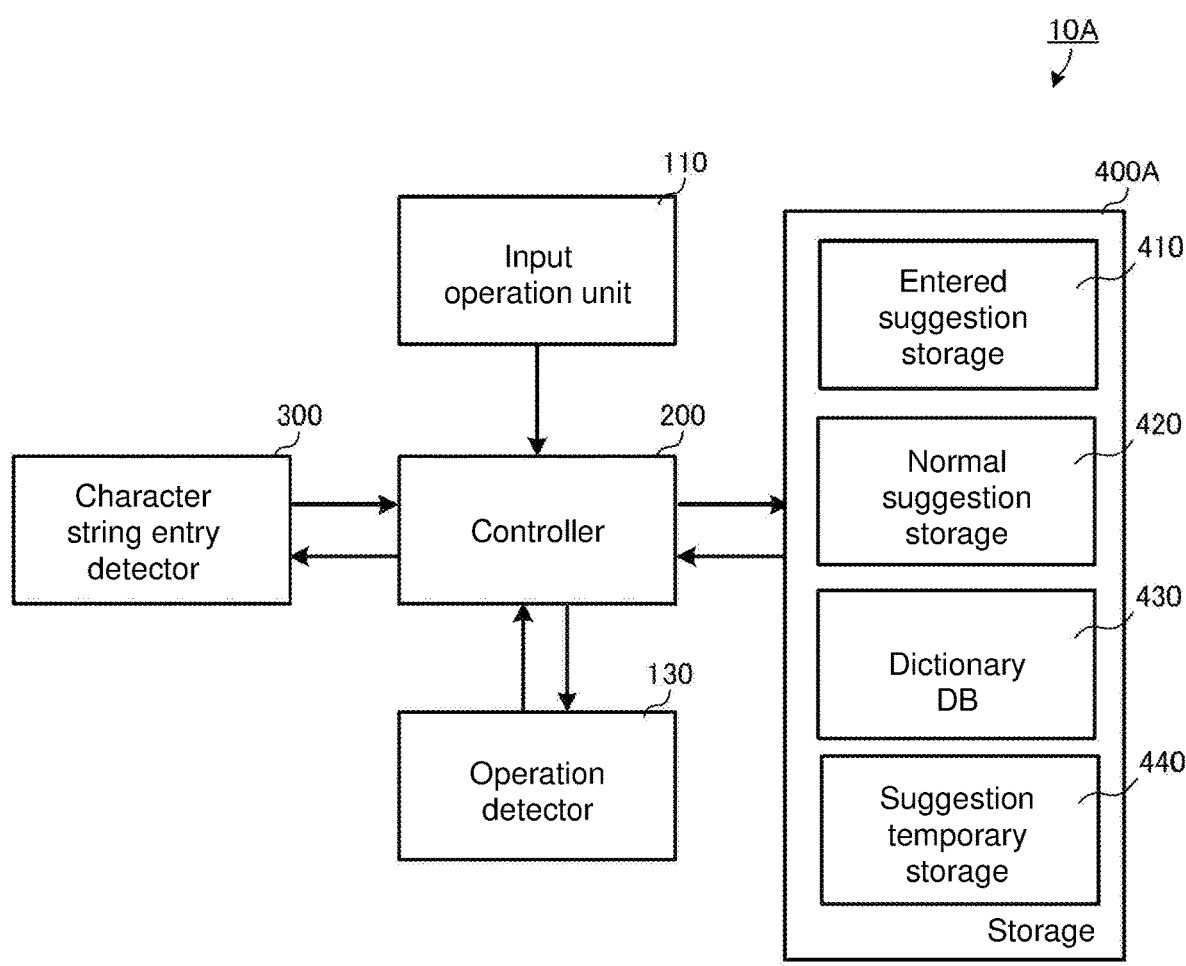
FIG. 7 is a block diagram illustrating a character input device according to a second embodiment.

A specific structure of a character input device 10A will now be described with reference to FIGS. 7 and 8A to 8D. FIG. 7 is a block diagram of a character input device 10A according to a second embodiment. FIGS. 8A to 8D are schematic diagrams of the character input device 10A according to a second embodiment. FIG. 9 is a flowchart showing an operation of the character input device 10A according to a second embodiment.

A second embodiment differs from a first embodiment in including a suggestion temporary storage 440. The other components and processes are the same as those in a first embodiment, and will not be described.

As shown in FIG. 7, a storage 400A includes the entered suggestion storage 410, the normal suggestion storage 420, the dictionary DB 430, and the suggestion temporary storage 440. The suggestion temporary storage 440 has the function of temporarily storing an entered suggestion to be stored into the entered suggestion storage 410.

A more specific process will be described with reference to FIGS. 8A to 8D.

The user inputs characters with a character input device 10A. The user activates an email application to display the character input fields 121 and 122.

Figure 8A:
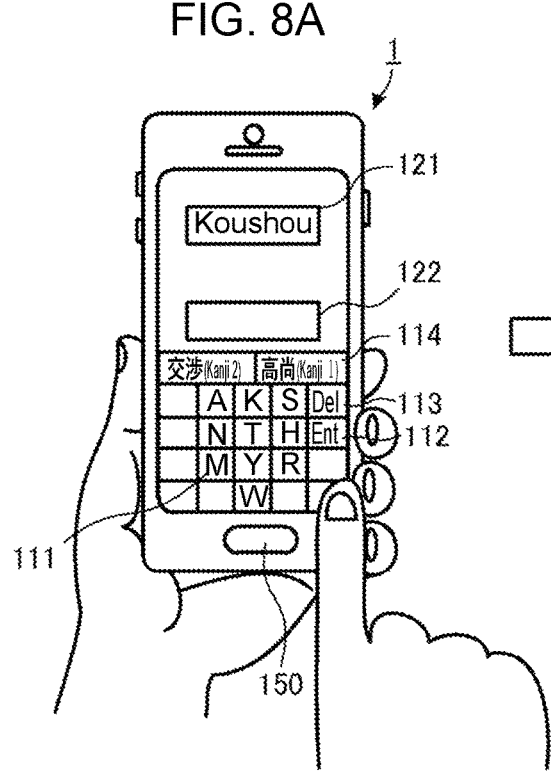
FIGS. 8A to 8D are schematic diagrams illustrating a character input device according to a second embodiment.
Figure 9:
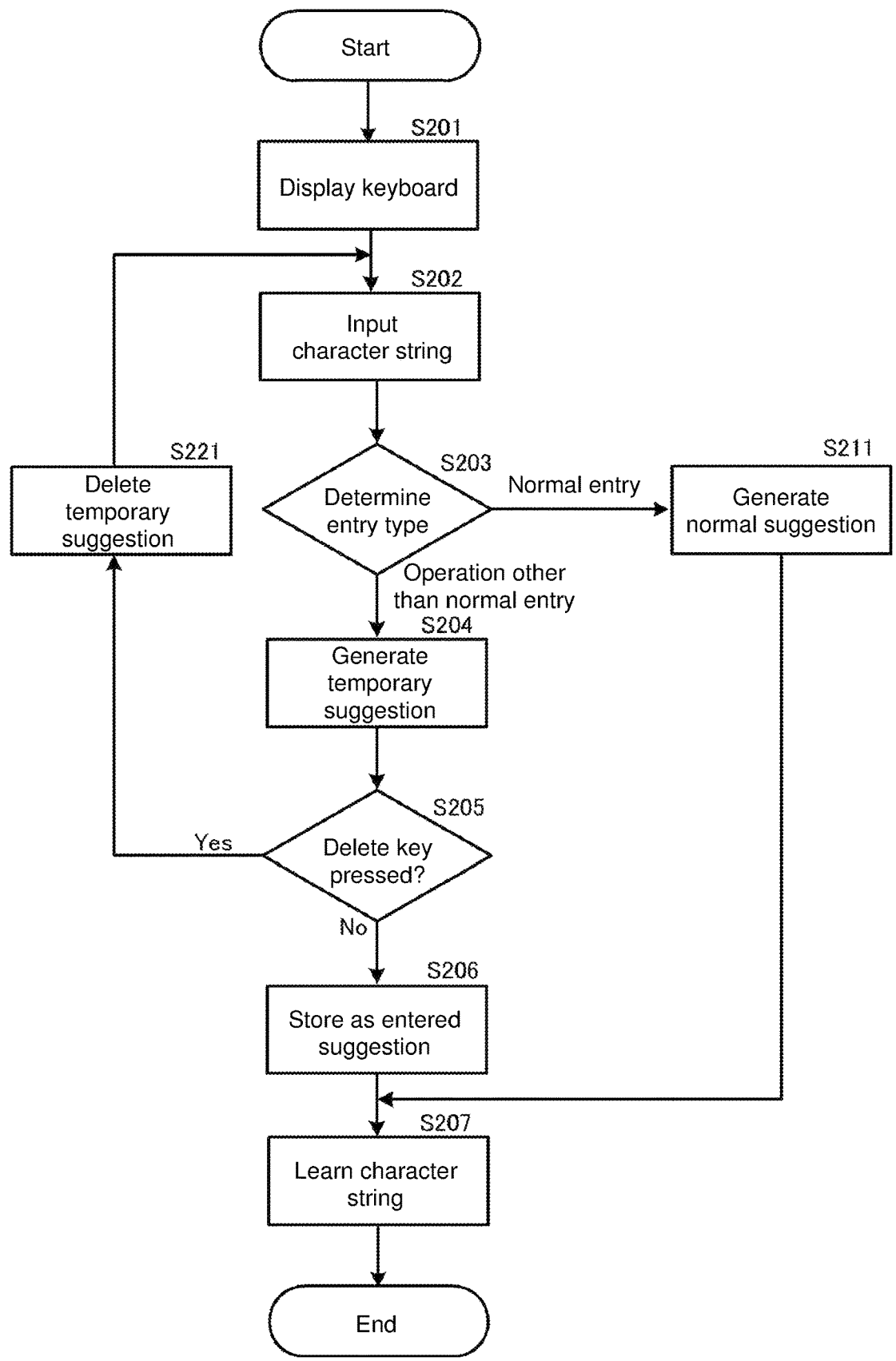
FIG. 9 is a flow diagram illustrating an operation of a character input device according to a second embodiment.

As shown in FIG. 8A, in response to the user selecting (touching) the character input field 121, the operation detector 130 outputs, to the controller 200, information indicating that the character input field 121 has the input focus.

The controller 200 activates the input operation unit 110. The user uses the character input keyboard 111 to input the Japanese hiragana characters Koushou. The input operation unit 110 outputs the hiragana character string Koushou to the controller 200. The controller 200 searches the dictionary DB 430 for conversion suggestions relevant to the hiragana character string Koushou. The controller 200 outputs the corresponding different sets of kanji characters (hereafter, Kanji 1 and Kanji 2) for the character string Koushou to the suggestion display 114.

Figure 8B:
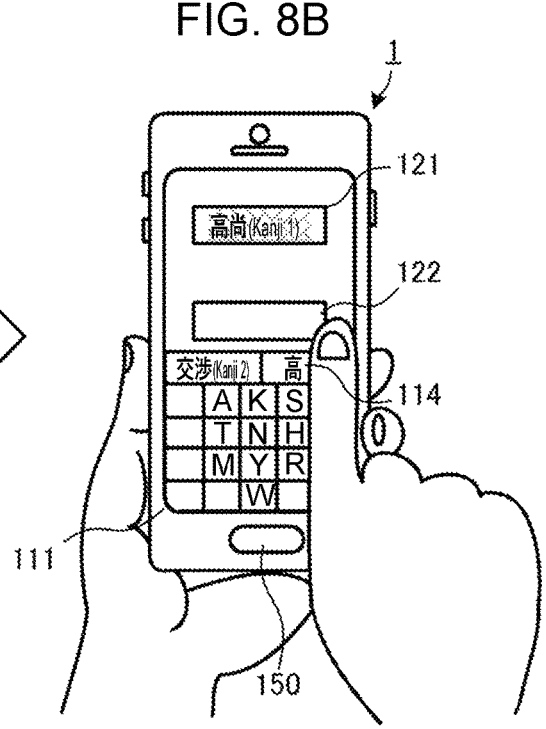

As shown in FIG. 8B, the input operation unit 110 outputs, to the controller 200, information indicating the character string Kanji 1 as a conversion-suspended suggestion. The user then moves the input focus from the character input field 121 to the character input field 122. The operation detector 130 thus detects movement of the input focus. The operation detector 130 outputs, to the controller 200, information indicating the movement of the input focus.

The operation detector 130 outputs, to the controller 200, information indicating entry of the character string Kanji 1 in response to the movement of the input focus. The controller 200 outputs, to the character string entry detector 300, information indicating that the character string Kanji 1 has been entered.

The character string entry detector 300 outputs the character string Kanji 1 to the controller 200 as an entered suggestion. The controller 200 stores the character string Kanji 1 into the suggestion temporary storage 440.

Figure 8C:
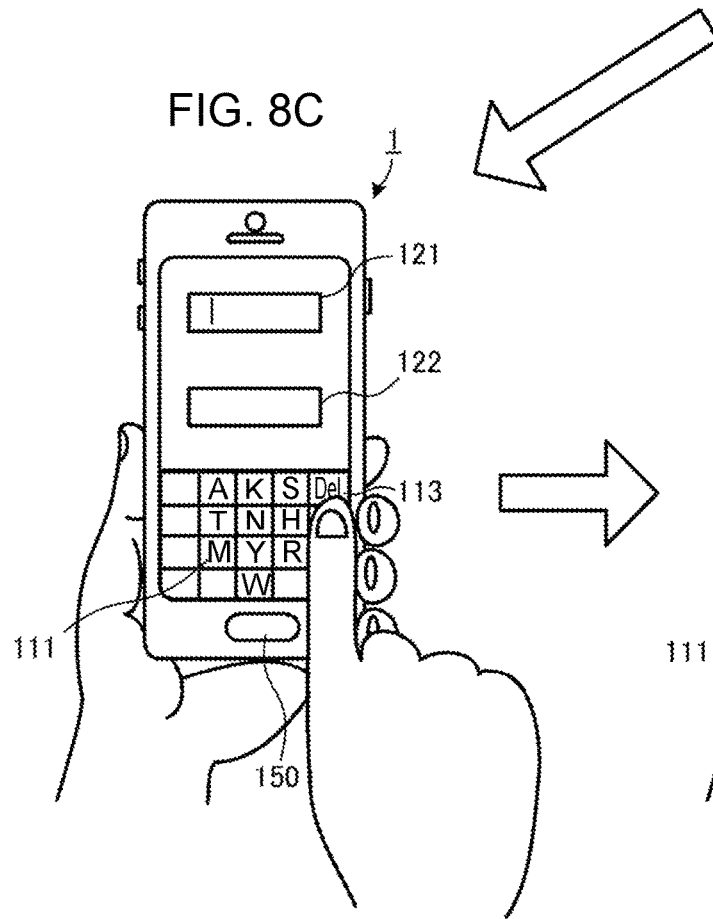

As shown in FIG. 8C, the user presses the delete button 113 to delete the character string Kanji 1 in the character input field 121. The operation detector 130 outputs, to the controller 200, information indicating that the character string Kanji 1 has been deleted.

The controller 200 deletes the character string Kanji 1 from the suggestion temporary storage 440.

Figure 8D:
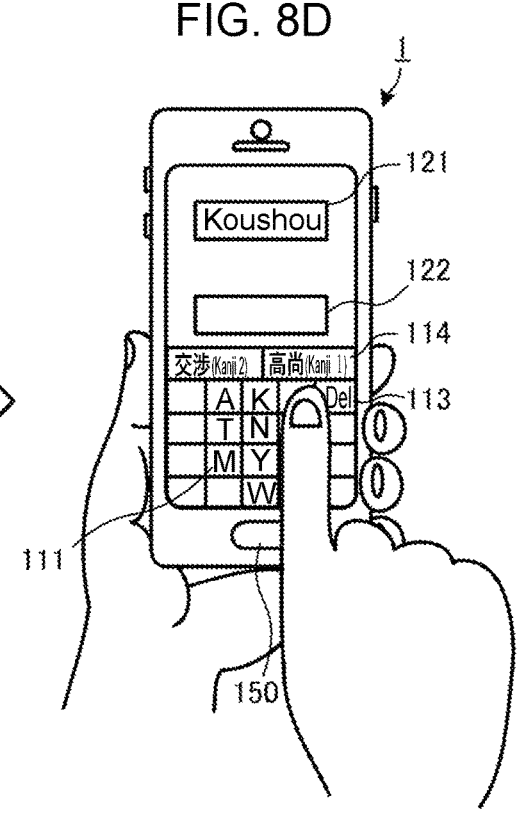

As shown in FIG. 8D, the user inputs the hiragana characters Koushou in the character input field 121. The suggestion display 114 then displays the corresponding different sets of kanji characters for the character string Koushou, Kanji 2, Kanji 1, and Kanji 3, in, for example, the stated order, without displaying the character string Kanji 1 with priority. More specifically, the entered suggestion storage 410 does not store the character string Kanji 1.

In the above structure, when the user starts inputting the next character before pressing the delete button 113, the controller 200 moves the character string Kanji 1 from the suggestion temporary storage 440 to the entered suggestion storage 410. As a result, the character string Kanji 1 is stored as an entered suggestion.

A process performed by the character input device 10A will be described with reference to the flowchart in FIG. 9.

The character input field 121 is selected to display the character input keyboard 111 (S201).

The character input field 121 receives an input of a character string. The controller 200 thus outputs conversion suggestions for the character string to the suggestion display 114 (S202).

The operation detector 130 determines the type of entry for the character string (S203). When the operation detector 130 detects movement of the input focus from the character input field 121 (input focus movement in S203), the character string entry detector 300 generates a temporary suggestion (S204).

The operation detector 130 determines whether the delete key is pressed (S205). When the input focus is moved again to the character input field 121 and the delete key is pressed (Yes in S205), the temporary suggestion is deleted (S221). The character input field 121 again receives an input of a character string (S202).

When the delete key is not pressed in step S205 (No in S205), the controller 200 stores the temporary suggestion into the entered suggestion storage 410 as an entered suggestion (S206), and learns the character string (S207).

When the operation detector 130 detects, for example, the enter button 112 being pressed in step S203 (normal entry in S203), the character string entry detector 300 generates a normal suggestion (S211), and learns the character string (S207).

The delete key not being pressed in step S205 corresponds to, for example, another character string being entered after the input focus is moved to the character input field 122.

This structure can also learn conversion suggestions when the input focus is moved, in addition to when the user explicitly presses the enter button. Further, this structure does not learn the character string when the input focus is moved erroneously, and thus improves the usability for character input.

Structures may be expressed as specified in the appendix below.

APPENDIX

A character input device (10), including:
an input operation unit (110) configured to receive an input of a character string;
an operation detector (130) configured to detect a change from a state in which the character string is output;
a character string entry detector (300) configured to enter the character string based on the change and generate an entered suggestion; and
a storage (400) configured to store the entered suggestion as a conversion suggestion.

REFERENCE SIGNS LIST 1 smartphone
10, 10A character input device
110 input operation unit
111 character input keyboard
112 enter button
113 delete button
114 suggestion display
121, 122 character input field
130 operation detector
150 home button
200 controller
300 character string entry detector
400, 400A storage
400A storage
410 entered suggestion storage
420 normal suggestion storage
430 dictionary DB
440 suggestion temporary storage

The invention claimed is:

1. A character input device, comprising:
an input operation unit, comprising a touchscreen display configured with a character input field to receive an input of a character string; and
a processor configured with a program to perform operations comprising:
operation as an operation detector configured to detect a change from a state in which input of the character string in the character input field is suspended corresponding to a change in an input focus away from the character input field; and
operation as a character string entry detector configured to:
enter the character string based on detecting the change in state and generate an entered suggestion; and
enter the character string based on not detecting the change in state and generate a normal suggestion; and
a storage comprising an entered suggestion storage and a normal suggestion storage, and configured to:
store, in the entered suggestion storage, the entered suggestion as a conversion suggestion in association with the character string, in response to the generation of the entered suggestion; and
store, in the normal suggestion storage, the normal suggestion as the conversion suggestion in association with the character string, in response to the generation of the normal suggestion.

2. The character input device according to claim 1, wherein
the processor is configured with the program to perform operations such that operation as the character string entry detector further comprises deleting the entered suggestion from the entered suggestion storage in response to detecting a deletion of the entered suggestion after the state change.

3. The character input device according to claim 1, wherein
the processor is configured with the program to perform operations further comprising analyzing a tendency for generating the entered suggestion, and associating the tendency and the entered suggestion with each other.

4. The character input device according to claim 3, wherein
the touchscreen display further comprises a suggestion display configured to display a plurality of conversion suggestions, the controller is configured to perform operations further comprising determining an order in which the conversion suggestions appear on the suggestion display based on the tendency.

5. The character input device according to claim 2, wherein
the processor is configured with the program to perform operations further comprising analyzing a tendency for generating the entered suggestion, and associating the tendency and the entered suggestion with each other.

6. The character input device according to claim 5, wherein
the touchscreen display further comprises a suggestion display configured to display a plurality of conversion suggestions,
wherein the processor is configured with the program to perform operations further comprising determining an order in which the conversion suggestions appear on the suggestion display based on the tendency.

7. A character input method implementable by a computer, the method comprising:
receiving an input of a character string, and displaying the character string in a character input field;
detecting a change from a state in which input of the character string in the character input field is suspended corresponding to a change in an input focus away from the character input field; and
entering the character string based on the detected change in state and generating an entered suggestion;
entering the character string based on not detecting the change in state and generating a normal suggestion;
storing, in an entered suggestion storage, the entered suggestion as a conversion suggestion in association with the character string, in response to the generation of the entered suggestion; and
storing, in a normal suggestion storage, the normal suggestion as the conversion suggestion in association with the character string, in response to the generation of the normal suggestion.

8. A non-transitory computer-readable storage medium storing a character input program, which when read and executed, causes a computer to perform operations comprising:
receiving an input of a character string, and displaying the character string in a character input field;
detecting a change from a state in which input of the character string in the character input field is suspended corresponding to a change in an input focus away from the character input field; and
entering the character string based on the detected change in state and generating an entered suggestion;
entering the character string based on not detecting the change in state and generating a normal suggestion; and
storing, in an entered suggestion storage, the entered suggestion as a conversion suggestion in association with the character string, in response to the generation of the entered suggestion; and
storing, in a normal suggestion storage, the normal suggestion as the conversion suggestion in association with the character string, in response to the generation of the normal suggestion.

9. The character input method according to claim 7, further comprising deleting the entered suggestion from the storage in response to detecting a deletion of the entered suggestion after the state change.

10. The character input method according to claim 7, further comprising analyzing a tendency for generating the entered suggestion, and associating the tendency and the entered suggestion with each other.

11. The character input method according to claim 10, further comprising:
displaying a plurality of conversion suggestions; and
determining an order in which the conversion suggestions appear on the suggestion display based on the tendency.

* * * * *